United States Patent [19]

Lindahl

[11] Patent Number: 5,379,507

[45] Date of Patent: Jan. 10, 1995

[54] METHOD OF MANUFACTURING A TANK

[75] Inventor: John R. Lindahl, Chapmansboro, Tenn.

[73] Assignee: State Industries, Inc., Ashland City, Tenn.

[21] Appl. No.: 99,985

[22] Filed: Jul. 30, 1993

Related U.S. Application Data

[63] Continuation of Ser. No. 898,388, Jun. 10, 1992, abandoned, which is a continuation-in-part of Ser. No. 505,318, Apr. 5, 1990, abandoned, which is a continuation-in-part of Ser. No. 329,688, Mar. 28, 1989, abandoned, which is a continuation-in-part of Ser. No. 179,670, Apr. 11, 1988, abandoned.

[51] Int. Cl.6 .................... B23P 19/04; B65D 90/02; B05D 7/22; B21D 22/20

[52] U.S. Cl. ........................ 29/460; 29/463; 29/527.2; 29/773; 29/801; 29/DIG. 11; 29/DIG. 48; 72/347; 220/565; 427/232

[58] Field of Search ............ 29/460, 463, 527.2, 29/527.3, 527.4, 773, 801, DIG. 29, DIG. 48, DIG. 11, DIG. 37; 72/347, 348, 349; 220/5 A, 465, 565; 219/121.67; 228/184; 427/230–234

[56] References Cited

U.S. PATENT DOCUMENTS

| | | | |
|---|---|---|---|
| Re. 24,187 | 7/1956 | Burwell | 427/234 |
| 3,473,687 | 10/1969 | Larsen et al. | 29/463 X |
| 4,032,257 | 5/1977 | Wright et al. | 29/460 |
| 4,491,717 | 1/1985 | Geffroy et al. | 219/121.67 |
| 4,625,892 | 12/1986 | Carlin, Jr. | 220/465 X |

FOREIGN PATENT DOCUMENTS

| | | | |
|---|---|---|---|
| 643539 | 9/1950 | United Kingdom | 427/232 |
| 1466774 | 9/1973 | United Kingdom | |

*Primary Examiner*—Peter Dungba Vo
*Attorney, Agent, or Firm*—Paul R. Puerner

[57] ABSTRACT

A tank construction including an outer shell of steel material comprised of two half members welded together. The half members are formed by a deep drawing process. An inner shell of non-corrosive material is cast inside the outer shell by a rotational casting procedure with the external surface of the inner shell located adjacent the internal surface of the outer shell. The inner shell of non-corrosive material provides a substantially leak-fight liner for the outer shell to thus prevent contact between the contents of the tank and the outer shell. The rotational casting of the inner shell inside the outer shell is accomplished by charging the outer shell with a non-corrosive material and then subjecting the outer shell to a rotational casting movement while heat is applied to the outer shell. The outer shell serves as a mold for the inner shell wherein the mold (outer shell) becomes a permanent part of the completed tank.

40 Claims, 8 Drawing Sheets

METHOD OF MANUFACTURING A TANK

This is a continuation of copending application Ser. No. 07/898,388 filed on Jun. 10, 1992 now abandoned, which in turn is a continuation-in-part of application Ser. No. 07/505,318 filed Apr. 5, 1990, now abandoned, which in turn is a continuation-in-part of application Ser. No. 07/329,688 filed Mar. 28, 1989, now abandoned, which in turn is a continuation-in-part of application Ser. No. 07/179,670 filed Apr. 11, 1988, now abandoned.

BACKGROUND OF THE INVENTION

This invention relates to an improved tank construction and to the method of making the improved tank construction. More particularly, this invention relates to an improved tank construction designed for use in a direct fired water heater. It will be appreciated, however, that the tank construction and method of manufacture of this invention is not limited to tanks used in water heaters, but would have application for other types of tanks.

SUMMARY OF THE INVENTION

A tank construction including an outer shell of metal material having an internal surface. The tank construction further has an inner shell of non-corrosive material which is cast inside the outer shell with the external surface of the inner shell located adjacent to the internal surface of the outer shell. The inner shell of non-corrosive material provides a substantially leak tight liner for said outer shell to prevent any appreciable contact between the contents of the tank and the outer shell.

DESCRIPTION OF THE DRAWINGS

FIG. 16 is a partially schematic view showing the steps of fabricating the upper tank half starting with the stamping of sheet steel to form circular blanks and proceeding to the step wherein the upper and lower halves are welded together;

DESCRIPTION OF THE PREFERRED EMBODIMENT

Figure 1:
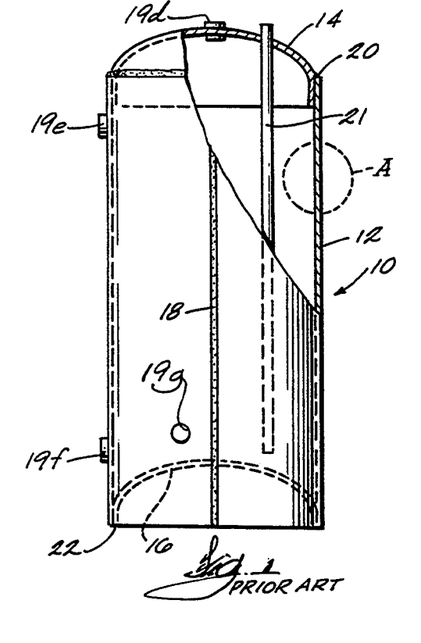
FIG. 1 is a side view (with pans broken away) of a conventional glass lined tank of the type used manufacture of residential water heaters for many years.
Figure 1A:
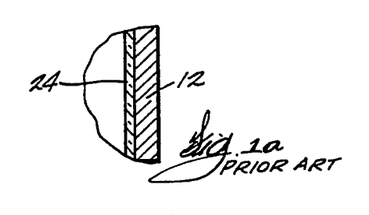
FIG. 1(a) is an enlarged fragmentary view of the circled area A on FIG. 1.
Figure 1B:
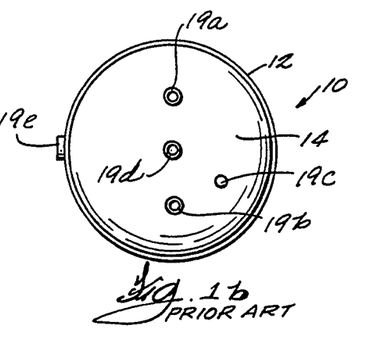
FIG 1(b) is a top plan view of the water heater shown in FIG. 1.

FIGS. 1, 1(a) and 1(b) show the construction of a conventional glasslined tank 10 of the type used in the manufacture of residential water heaters for many years.

The tank 10 is comprised of a shell member 12, a top member 14 and a bottom member 16. Shell 12 is made from a rolled sheet of steel which is welded longitudinally as indicated by reference numeral 18 in FIG. 1. Suitable connection fittings are welded to top member 14 and shell 12. Fittings 19(a), 19(b), 19(c), 19(d) [FIG. 1(b)] are for a hot water connection, a cold water connection, a mounting for a sacrificial anode, and a mounting for a temperature—pressure relief valve, respectively. Fittings 19(e) and 19(f) (FIG. 1) are for heating element and thermostat connections, respectively, and fining 19(g) is a drainage valve connection.

Top member 14 is fastened to shell 12 by a weld 20. After top member 14 an shell 12 have been assembled and welded, a glass lining is applied to the inside surface of the top member and shell by a conventional process which is well known in the art.

A glass lining is also applied to what will constitute the bottom member 16. Bottom member 16 with the glass lining applied thereto is then welded into the bottom of shell 12 by a weld 22 to complete the fabrication of the tank. FIG. 1(a) is an enlarged view of area A in FIG. 1 showing the glass lining 24 applied to the shell 12. As indicated above, top and bottom members 14 and 16 will also have a glass lining thereon like lining 24 on shell 12. It will be appreciated that when making the final weld 22 to fasten bottom member 16 to shell 12, the heat produced in the weld area may cause hairline cracks or other damage to the glass lining in such area. A sacrificial anode member 21 is provided to retard corrosion of any metal portion of the tank that is contacted by water in the tank because of failure of the glass lining.

The construction of the tank of this invention will be described by a step-by-step description of the method of constructing the tank.

Figure 2:
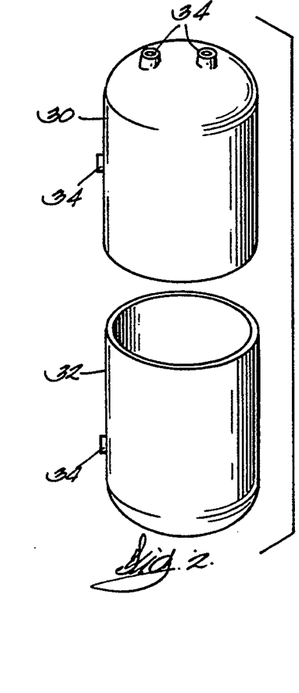
FIG. 2 is a perspective view of the two parts of the outer shell of the tank of the present invention prior to the assembly of such parts into the completed shell.
Figure 3:
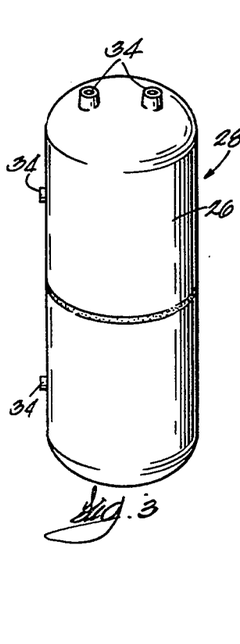
FIG. 3 is a perspective view of the outer shell of the tank with the two parts fastened together.

Referring to FIGS. 2 and 3, outer shell 26 of the completed tank 28 is comprised of two parts, namely, an upper half member 30 and a lower half member 32. In one embodiment of the invention, half members 30 and 32 are made of steel or other suitable metal and are each formed from a single blank of such metal by a deep drawing process. The type of metal used and the wall thickness of each finished haft member 30 and 32 will vary depending on the tank application involved. As an example of a typical embodiment of a steel tank for a residential electric water heater with a rated capacity of 40 gallons, the specifications may be as follows:
Steel—Cold Rolled (A.K.D.Q.)
Wall thickness—0.040-0.065 inches
Diameter—approximately 16 inches
Vertical Height (each half)—approximately 23 inches
Method of Deep Drawing—Draw-reverse draw-redraw combination It will be appreciated that outer shell 26 could be fabricated from more than two parts. For example, an extra long shell could be fabricated from a top and bottom member and an intermediate member of cylindrical shape.

Also in the preferred embodiment, a plurality of connection fittings 34 are mounted on the half members for purposes of connection to hot and cold water lines, mounting and connecting internal heating elements, a drainage connection and any other desired purpose. The particular construction and method of fabrication of connection fittings specially adapted for use in the tank of this invention are described in application Ser. No. 07/330,118 filed Mar. 19, 1989.

Referring to FIG. 3, the half members are fastened together in a secure manner to form a completed outer shell 26. In a preferred embodiment, the hall members 30 and 32 are securely fastened to each other by welding. Suitable welded joints for this purpose are shown in FIGS. 7, 8, 9, 10 and 11.

Figure 7:
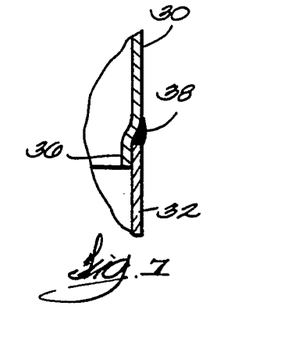
FIG. 7 is an enlarged fragmentary sectional view showing one embodiment of the welded connection between the two parts of the outer shell.
Figure 8:
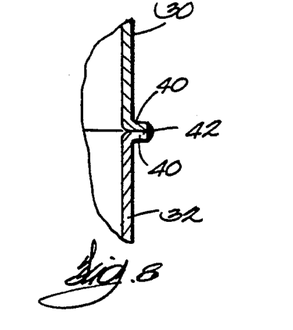
FIGS. 8-11 are enlarged fragmentary sectional views of other embodiments of the welded connection on between the two parts of the outer shell.
Figure 9:
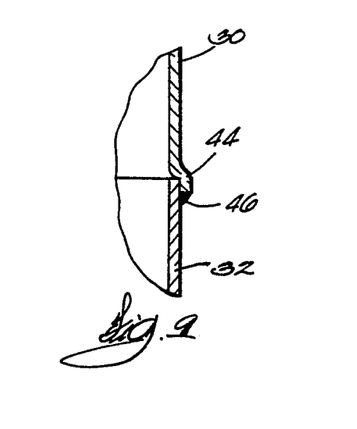
Figure 10:
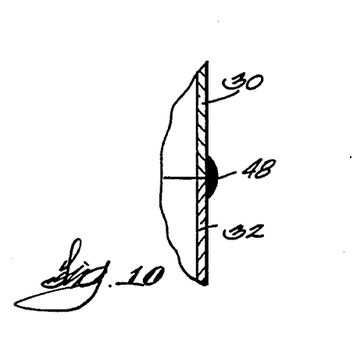
Figure 11:
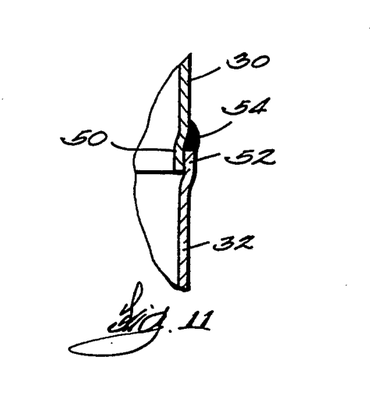

In the FIG. 7 embodiment, half member 20 is deformed as at 36 to provide an overlapping fit with hall members 20 and 32 fastened together by a weld 38. In the FIG. 8 embodiment, hall members 30 and 32 are provided with mating flanges 40 with hall members 30 and 32 fastened together by a weld 42. In the FIG. 9 embodiment, hall member 30 is deformed as at 44 to provide an overlapping fit with the half member fastened together by a weld 46. In the FIG. 10 embodiment, the edges of the hall members are positioned in abutting relationship and then fastened together by a weld 48. In the FIG. 11 embodiment, hall members 30 and 32 are deformed as at 50 and 52 to provide an overlapping fit with the half members fastened together by a weld 54.

Figure 5:
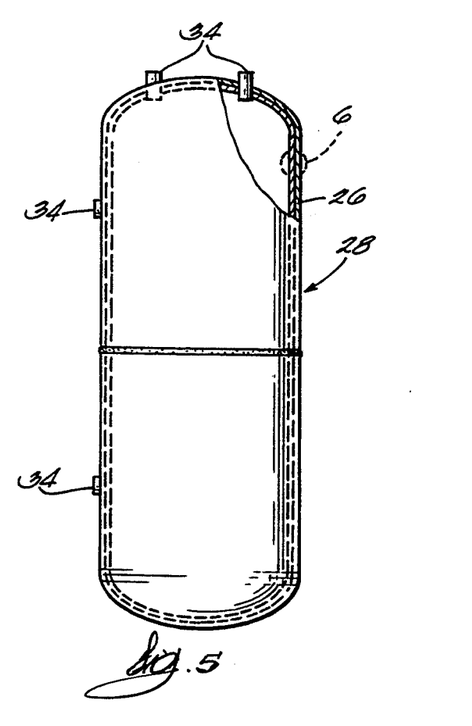
FIG. 5 is a side elevational view of the completed tank with a part of the outer and inner shells broken away.
Figure 6:
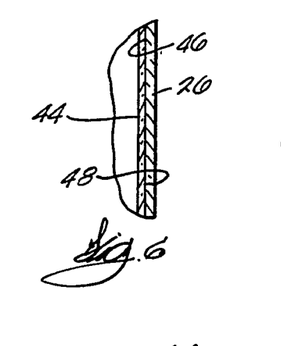
FIG. 6 is an enlarged fragmentary view of the area 6 of FIG. 5.

After the completed outer shell is fabricated as described above, an inner shell 44 of non-corrosive material (i.e., a material from the family of polymers) is formed inside the outer shell adjacent the internal surface 46 of the outer shell 26 (FIGS. 5 and 6). For example, the non-corrosive material may be polyethylene, polypropylene, polybutylene, polysulfone or nylon. More specifically, in the preferred embodiment, the non-corrosive material is polybutylene material made by polymerization of butane-1 with Ziegler catalyst. In one embodiment, the inner shell is formed by a rotational casting procedure. More specifically, the polymer material is introduced into the outer shell 26 through any suitable opening therein and then all openings are closed by a suitable manner. The material preferably is in a powdered form.

Figure 12:
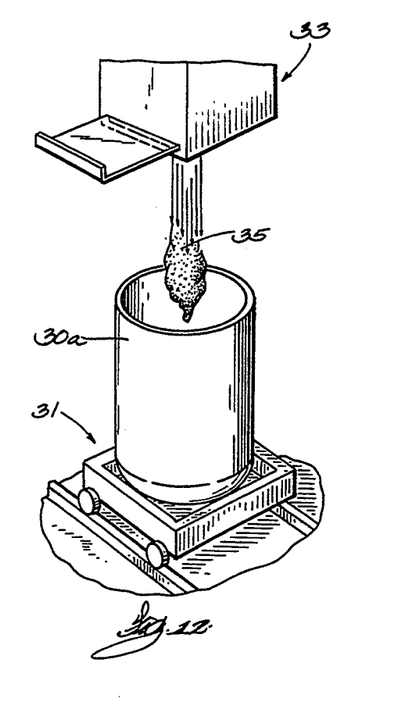
FIG. 12 is a partially schematic perspective view showing the fabrication step wherein a polymer material is introduced into a shell half member before the half members are welded together.
Figure 13:
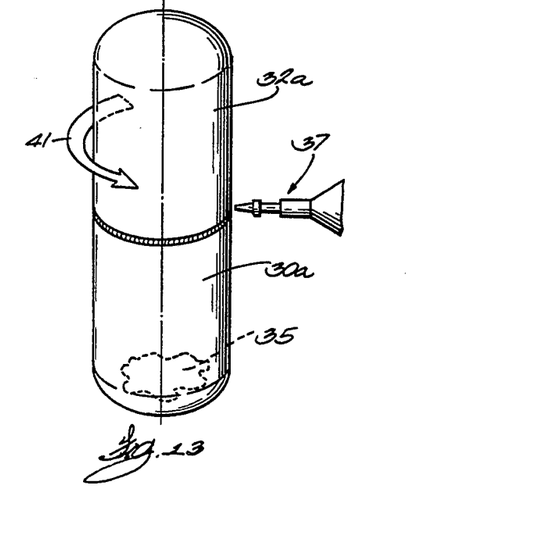
FIG. 13 is a partially schematic view showing the two half members being welded together.

An alternative to the above described fabrication method is shown in FIGS. 12 and 13. FIG. 12 shows a tank hall member 30(a) mounted on a conveyor means 31 and an automatic dispensing means 33. The tank half member 30(a) is moved relative to the dispensing means 33 and at the appropriate time, a measured amount of polymer material 35 is dispensed from the dispenser means 33 into the opened end of the tank half 30(a).

FIG. 13 shows the step of welding tank hanes 30(a) and 32(a) together. Weld 35 is made by any suitable welding apparatus (such as a laser welder) shown schematically and identified by reference number 37. The weld 35 can be made by rotating the tank hanes 30(a), 32(a) relative to welding apparatus 37 about the vertical axis 39 of the tank as indicated by the arrow 41 in FIG. 13. It will be noted that the weld 35 is made with the axis 39 of the tank in a vertical position. By following this procedure, the polymer material 35 in the tank will be located in the bottom of the tank remote from the weld area during the welding operation.

Figure 4:
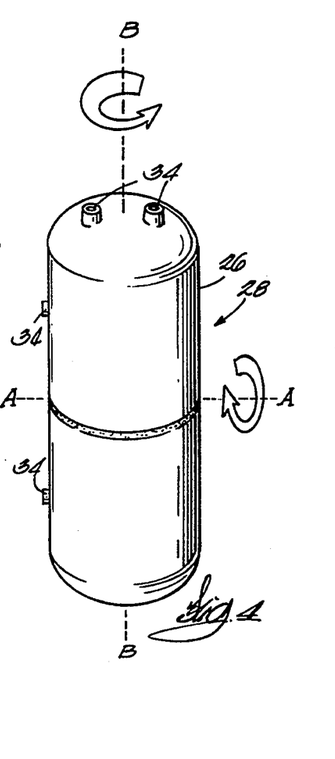
FIG. 4 is a partially schematic view of the outer shell of the tank when subjected to rotational movement.

The outer shell 26 charged with a polymer material as described above is then subjected to a rotational casting movement while heat is applied to the outer shell. As shown in FIG. 4, such a rotational movement can be the simultaneous rotation of the shell outer 26 about axes A—A and B—B while heat is applied to the shell. In the FIG. 4 embodiment, axes A—A and B—B are at right angles to each other and intersect shell 26 at the center of the shell. Other rotational movements, either full or partial, may be used wherein the material in the tank will be distributed uniformly over the internal surface of the shell 26.

Referring again to a typical 40 gallon tank for use in a residential electric water heater, the specifications for the rotational procedure may be as follows:
Non-corrosive material—polymer
Weight of non-corrosive material—range 2.0 to 7.0 lbs.
Temperature applied to outer shell during rotation—range 350° to 800° F.

In one acceptable rotational casting procedure, the tank is rotated about axis B at four times the speed of rotation around the axis A as shown in FIG. 4. Also in one embodiment, the time of rotation is within the range of 6–13 minutes.

Figure 14:
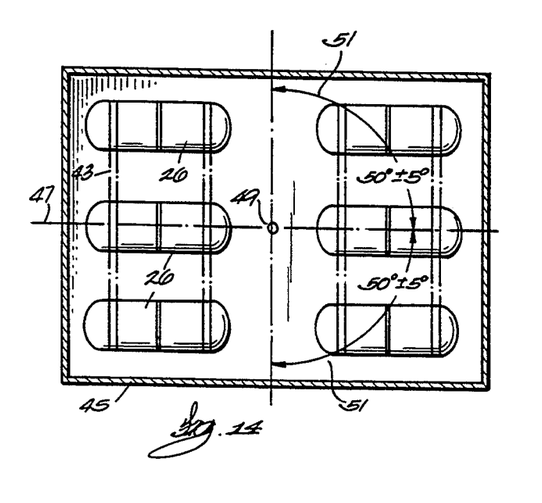
FIG. 14 is a partial schematic elevation view of a rotational casting apparatus suitable for use in the method of the present invention.
Figure 15:
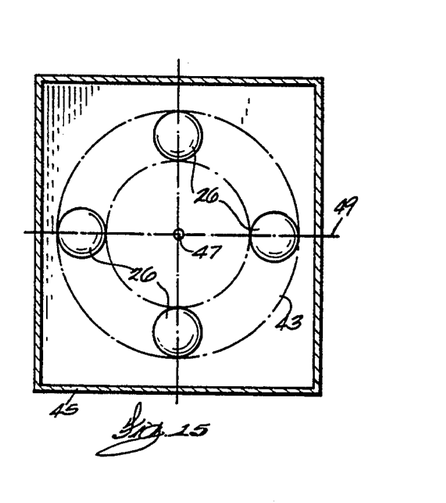
FIG. 15 is a partially schematic end view of the apparatus shown in FIG. 14.

A second acceptable rotational casting procedure is shown in FIGS. 14 and 15. As there shown, a plurality of assembled outer shells 36 (with polymer material introduced into the interior) are mounted on a rotatable rack structure shown schematically and identified by the reference numeral 43. Rack structure 43 is mounted in a casting oven shown schematically and identified by the reference numeral 45. The rack 43 is mounted in the oven for rotation in the oven about the axis 47. The rack 43 (with shells 26 mounted thereon) is rotated in the casting oven 45 by any suitable drive means (not shown). The oven itself is mounted on an axis 49 so that it can be rocked back and forth from a horizontal position about axis 49.

In practice, the outer shells 26 which have been charged with a polymer material are loaded into oven 45 on rack 43. The rack is then rotated about axis 47 while at the same time, the oven is rocked back and forth about axis 49. During such rotation and rocking motion, heat is applied to the shells 26 on the rack. The temperature applied is within the range of 350°–800° F. and the angle of rocking from the horizontal is 50°±5° as indicated by reference numeral 51. In the preferred embodiment, the period of time the shells 26 are in the oven during the rotational casting step is approximately 10 minutes.

By following one of the above procedures, an inner shell 44 is east in place inside outer shell 26 with the external surface 48 of inner shell 44 located adjacent the internal surface 46 of the outer shell 26. In the embodiment described above, the thickness of inner shell 44 may be in the range of 0.050–0.080 inches.

The inner sell 44 thus provides a continuous and substantially leak-tight liner for the outer shell 26 to thus prevent any appreciable contact between the contents of the tank and the outer shell. There may be some very limited seepage into contact with the outer shell at the connection fittings 34. Such seepage of water will soon become starved of oxygen due to some very minor initial corrosion after which further corrosion will be negligible. Corrosion of the outer shell by the contents of the tank (such as water) is thus eliminated for all practical purposes.

It will be appreciated that shell 26 serves as a mold which is not removable or reusable but becomes a part of the completed tank 28. The rotational casting procedure described above may be performed by any suitable apparatus designed to produce the desired results.

It will be appreciated from the foregoing description that the completed tank 28 of this invention can be fabricated without subjecting the outer shell 26 to temperatures in excess of 800° F. Thus, since it is unnecessary to subject the steel material of the outer shell to annealing temperatures in excess of 800° F. (as is the case in prior glass-lined tanks), the required tank strength for withstanding internal minimum hydrostatic test pressure as required by applicable industry standards can be obtained with a shell wall thickness which is substantially less than that required in the prior glass-lined tank construction. The amount of steel required to fabricate a tank of any given capacity is thus substantially reduced.

It will be further appreciated that in the tank of the present invention, wherein the outer shell is fabricated from a pair of deep drawn half members fastened together by a single weld joint, the welding required is substantially reduced as compared with the prior glass-lined tank.

It is also noted that the tank construction of the present invention wherein the outer shell is protected by the inner shell from corrosive effects by water or other liquids in the tank, corrosion protection measures such as the use of a sacrificial anode member mounted in the tank are eliminated resulting in a further reduction in cost.

FIG. 16 is a partially schematic view showing the steps of fabricating the upper tank half, starting with the stamping of sheet steel to form circular blanks and proceeding to the step wherein the upper and lower halves are welded together. The steps shown in FIG. 16 show the fabrication of the tank in greater detail than described previously.

Referring to FIG. 16, sheet steel 52 is fed from a roll 54 into a blanking press 56. Press 56 cuts circular blanks 58 from sheet steel 52, which are then stacked for transportation to a draw press referred to schematically by reference numeral 16.

The draw press forms each blank 58 into a tank top half 66 by a three-step drawing action. The first step forms a blank 58 into an intermediate tank part 62 by a first draw. The second step forms part 62 into an intermediate tank part 64 by a reverse draw. The third step forms the part 64 into a final upper tank haft 66 of the desired size and shape by a re-draw.

Upper tank half 66 is then transported to a trimming and flanging station 68 where the edge of the tank haft 66 is trimmed and flanged. The material trimmed from the tank edge is identified by reference numeral 70 and the welding flange formed on the tank edge is identified by the reference numeral 72. Suitable welding flange configurations are shown and described previously in this specification. The trimming and flanging steps are performed by rotating tank haft 66 (as shown by the arrow) relative to a stationary cutting and forming tool means 74 of a suitable design.

Tank haft 66 is then passed through a washer 76 of any suitable design to prepare the tank 66 for further fabrication steps.

From washer 76, tank haft 66 is transported to a tank connector installation station 80. At station 80, openings 82 are punched in the tank haft and thereafter connector fittings 84 of a suitable size and shape are installed by welding. With an upper tank 66 for use in fabricating the tank for use in a electric water heater, connector fittings 84 are installed in both the top and the side of the tank half 66.

Tank haft 66 is then transported to a station 86 wherein the tank half is inverted so that its open end will be facing upwardly. A measured amount of polymer material 88 in powder form is charged into tank haft 66 by an overhead automatic dispensing means 90.

Upper tank haft 66 is then transported to a welding station 92 wherein tank haft 66 is positioned relative to a lower tank haft 116 for welding. Lower tank half 116 is fabricated as shown in FIG. 17, which will be described hereinafter.

Tank halves 66, 116 are welded together, preferably by a laser welder shown schematically by reference numeral 94. The weld 96 is made by rotating the tank halves 66, 116 relative to laser welder 94 with the axes 98 of the tank halves in a vertical position. Thus, weld 96 is made with the polymer material 88 in the tank half 66 located remote from the weld area. A completed tank shell 100 is thus produced for further fabrication steps to be described hereinafter.

Figure 17:
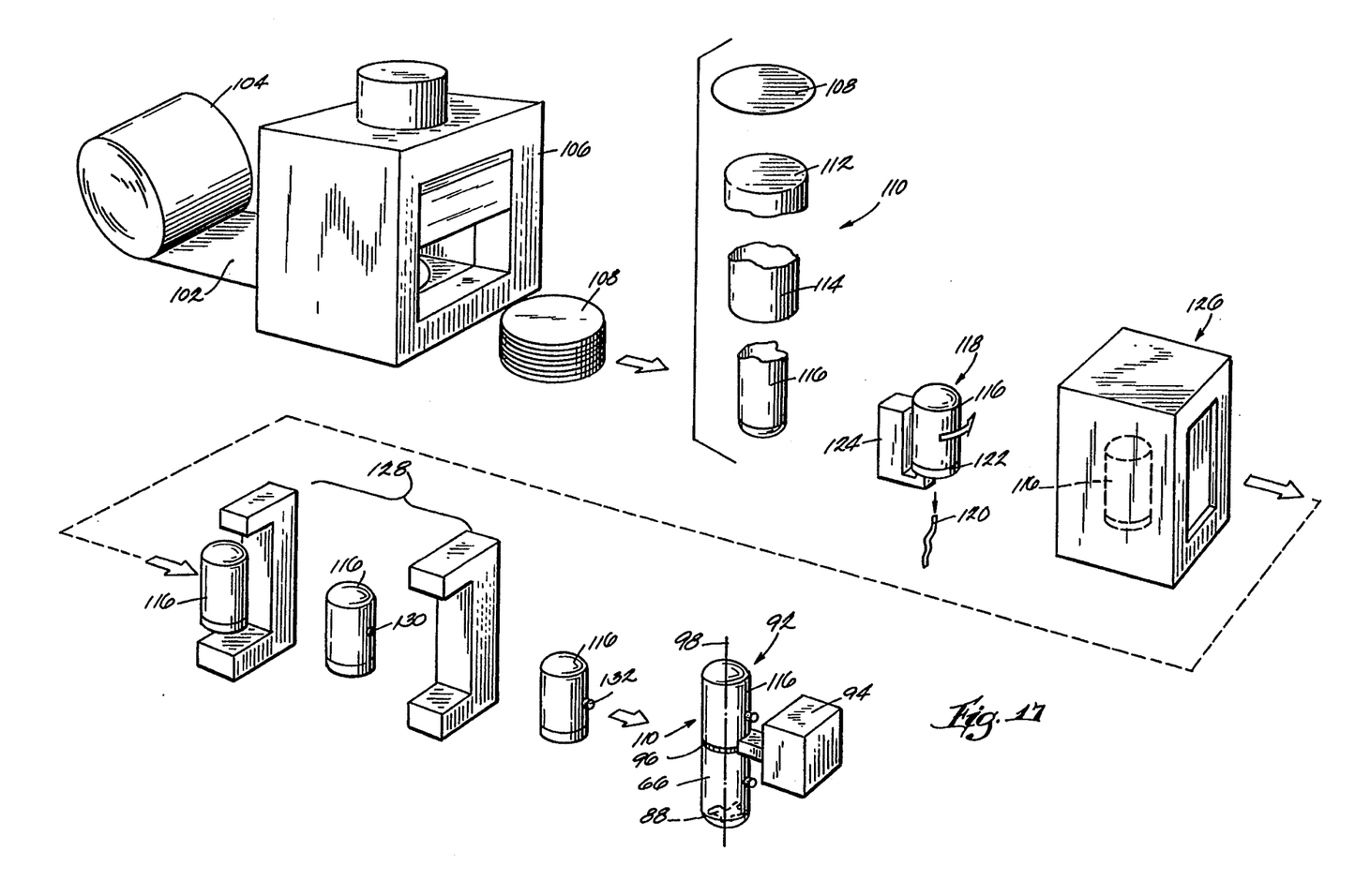
FIG. 17 is a partially schematic view similar to FIG. 16, but showing the comparable steps for forming the lower half of the tank.

FIG. 17 is a partially schematic view similar to FIG. 16 but showing the comparable steps for forming the lower half of the tank. In the preferred embodiment, the assembly line of FIG. 17 would run substantially parallel to the assembly line of FIG. 16. As shown in FIG. 17, sheet steel 102 is fed from a roll 104 into a blanking press 106. Press 106 cuts circular blanks 108 from sheet steel 102, which are stacked for transportation to a draw press referred to schematically by reference numeral 110.

The draw press forms each blank 108 into a tank top bottom by a three-step drawing action. The first step forms a blank 108 into an intermediate tank part 112 by a first draw. The second step forms part 112 into an intermediate tank pan 114 by a reverse draw. The third step forms the part 114 into a final lower tank half 116 of the desired size and shape by a re-draw.

Lower tank half 116 is then transported to a trimming and ranging station 118 where the edge of the tank half 116 is trimmed and ranged. The material trimmed from the tank edge is identified by reference numeral 120 and the welding flange formed on the tank edge is identified by the reference numeral 122. The trimming and flanging steps are performed by rotating tank half 116 (as shown by the arrow) relative to a stationary cutting and forming tool means 124 of a suitable design.

Tank half 116 is then passed through a washer 126 of any suitable design to prepare the tank 116 for further fabrication steps.

From washer 126, tank half 116 is transported to a tank connector installation station 128. At station 128, openings 130 are punched in the tank half and thereafter connector fittings 132 of a suitable size and shape are installed by welding. With a lower tank half 116 for use in fabricating an electric water heater tank, connector fittings 132 are installed only in the side of the tank half.

Lower tank half 116 is then transported to a welding station 92 wherein tank halves 66 and 116 are positioned relative to each other for welding.

Tank halves 66 and 116 are welded together, preferably by a laser welder as described previously.

FIGS. 18(a)–18(e) show partially schematic views of the fabrication steps starting with the loading of tank shells 100 on a rotatable carousel and concluding with the unloading of the tanks 100 from the carousel after passing through the rotational casting step and the final cooling step.

Figure 19:
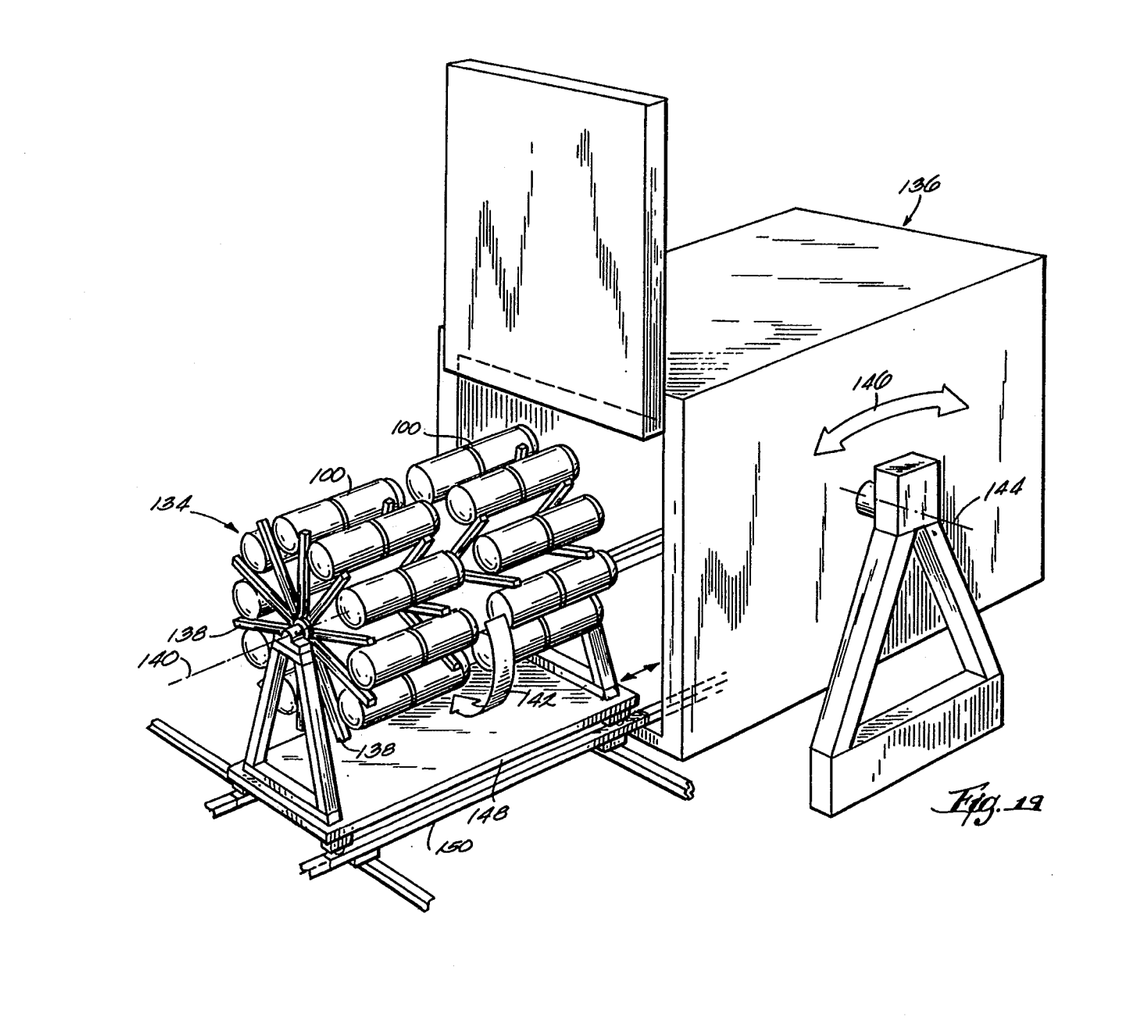
FIG. 19 is a partially schematic view of a rotational casting apparatus suitable for use in the method of the present invention.

FIG. 19 shows a carousel 134 loaded with tank shells 100 at the entrance to a rotational casting oven 136. Carousel 134 is comprised of a plurality of radially extending arms 138 adapted to support and hold tank shells 100 securely on the carousel. Arms 138 (and tanks 100) are mounted for rotation about an axis 140 as indicated by arrow 142. Such rotation is accomplished by a suitable prime mover (not shown) operatively connected to the arms 138.

The entire oven 136 (with the loaded carousel positioned therein) is adapted to be rocked back and forth about an axis 144 as indicated by arrow 146. A prime mover (not shown) is operatively connected to oven 136 to produce the desired rocking motion.

Carousel 134 is provided with a wheeled carriage platform 148 adapted to roll on rafts 156 and on and off a shuttle cart 150 which, as will be described hereinafter, operates to shuffle the carrousels back and forth between the oven and the tank cooler.

Figure 18A:
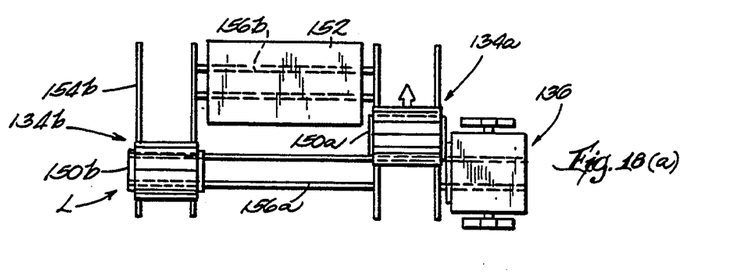
FIGS. 18(a)-18(e) are partially schematic views showing the steps of fabrication starting with the loading of the tank shells on a rotatable carousel and concluding with the unloading the tanks from the carousel after passing through the rotational casting step and the final cooling step.

Referring now to FIGS. 18(a)–18(e), FIG. 18(a) shows a loaded carousel 134(a) which has just exited from oven 136 onto a shuttle cart 150(a) and is being transferred as shown by the arrow towards the entrance to cooling chamber 152. The shuttle cart 150(a) rides back and forth on tracks 154(a) between the oven 136 and the entrance to cooling chamber 152. A second loaded carousel 134(b) is shown at the tank loading station L. Carousel 134(b) in FIG. 18(a) is shown positioned on a shuttle cart 150(b) which rides back and forth between loading station L and the exit end of cooling chamber 152.

Figure 18B:
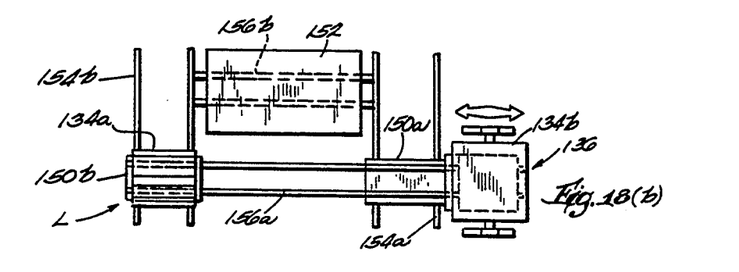

FIG. 18(b) shows the loaded carousel 134(b) inside oven 136 where the rotational casting step previously described is being performed. Carousel 134(b) would have been transferred from its position shown on FIG. 18(a) across rails 156(a) and into the oven. It is noted that as the carousel moves into the oven, it crosses over the shuttle cart 150(a). Also as shown in FIG. 18(b) is the carousel 134(a) which is shown in the loading station L. Carousel 134(a) would have traveled from its position shown in FIG. 18(a) up to the entrance of the cooling chamber 152, then through the cooling chamber on rails 156(b). As it exits cooler 152, it will roll on shuttle cart 150(b) and it will then be carried on rails 154(b) to the loading station L where the tanks are then loaded onto the carousel.

Figure 18C:
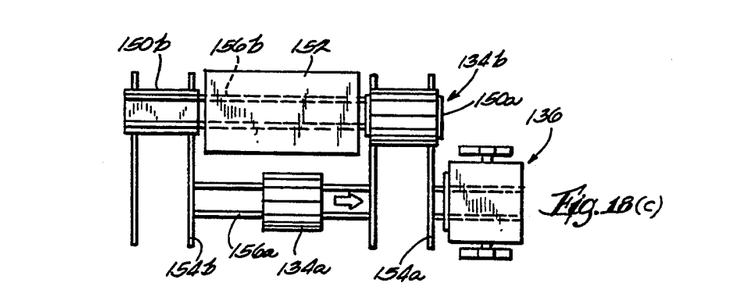

FIG. 18(c) shows the carousel 134(b) at the entrance to the cooling chamber 152. It will have moved from its position in the oven as shown in FIG. 18(b) onto shuttle cart 150(a) and then on rails 154(a) to the entrance of the cooler 152. Also as shown in FIG. 18(c), the loaded carousel 134(a) is being transported from the loading station towards the oven on rails 156(a).

Figure 18D:
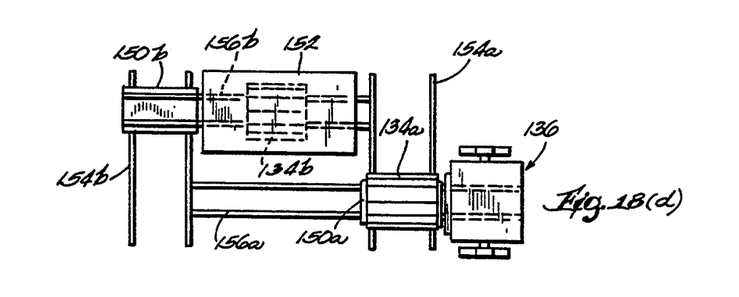

FIG. 18(d) shows carousel 134(b) being transferred through the cooling chamber 152 on rails 156(b). FIG. 18(d) also shows loaded carousel 134(a) at the entrance to oven 136. Carousel 134(a) would have moved from its position shown on FIG. 18(c) onto the shuttle cart 150(a).

Figure 18E:
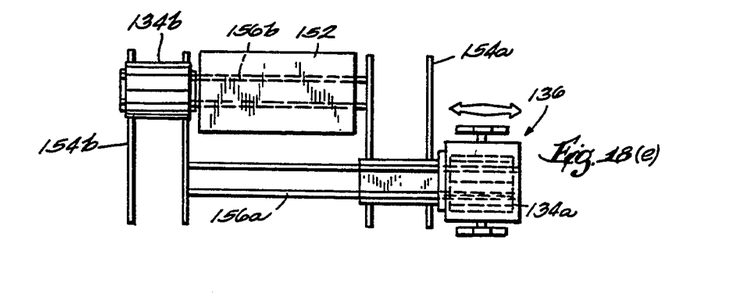

FIG. 18(e) shows loaded carousel 134(a) inside oven 136 wherein the rotational casting step is being performed. Carousel 134(a) would have moved from its position shown on FIG. 18(d) off of the shuttle cart 150(a) and into the oven. FIG. 18(e) shows carousel 134(b) at the exit end of cooler 152 wherein it has moved from the position shown in FIG. 18(d) out of the cooler 152 onto shuttle cart 150(b).

It will be appreciated that the above-described fabrication steps as shown in FIGS. 16, 17, 18(a)–(e) and 19 are designed for performance by automatic machinery using computer controlled robots, conveyors and other automatic machines. In the preferred embodiment of this invention, the entire fabrication process is accomplished with automatic equipment with a minimum of manual manipulation and control required.

A preferred embodiment for charging the powdered polymer material through an opening in the tank wall after the tank halves have been welded together is shown in FIGS. 20–23. In the FIG. 20–23 embodiment, the powdered polymer material is introduced into a tank 160 through a metal connector fitting (spud) 162 welded in an opening in the wall of the tank. An insert member 164 of polymer material is mounted in fitting 162 to which an inner shell 44 of polymer material is subsequently fused.

Figure 20:
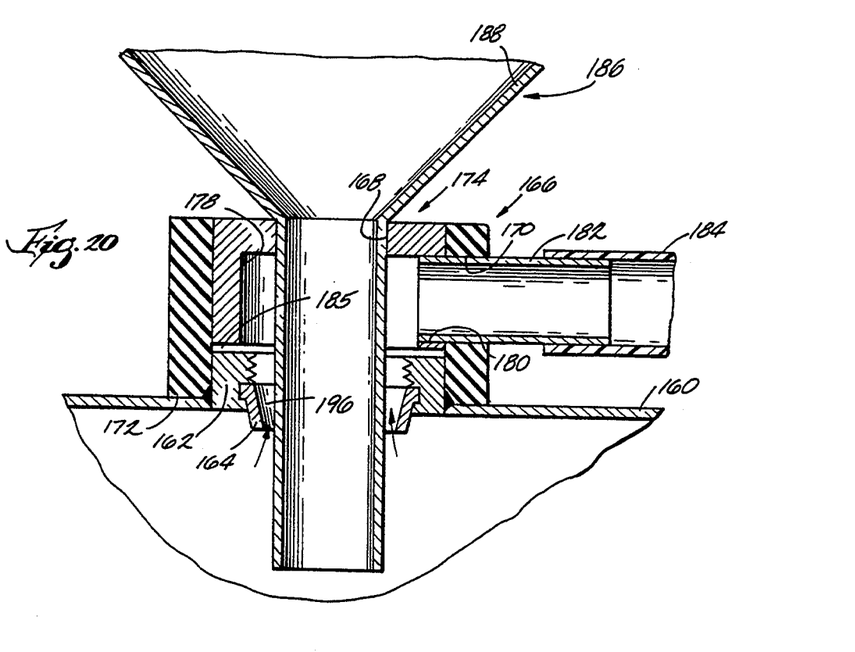
FIG. 20 is a cross-sectional view showing a vacuum charging assembly positioned in an opening in the side of tank.

Mounted exteriorly of fitting 162 is a collar member 166 preferably of rubber material. Collar member 166 has a passageway 168 extending therethrough and a side opening 170 therein. The lower portion of passageway 168 fits snugly around fitting 162 and the bottom end surface 172 of collar 166 fits snugly against the wall of tank 160.

Mounted in the top portion of passageway 168 of collar 166 is a second collar 164 preferably of steel material. Collar 174 (FIGS. 21, 22) has a top inwardly extending flange 176, an opening 192 in the flange, an internal cavity 178 and a side opening 180.

Figure 21:
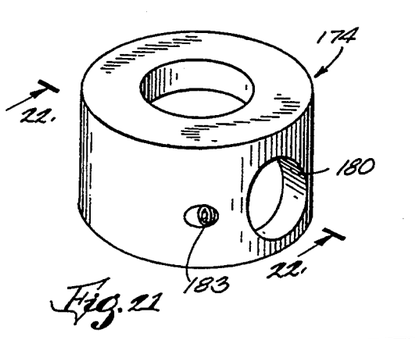
FIG. 21 is a perspective view of the steel collar used in the assembly of FIG. 20.
Figure 22:
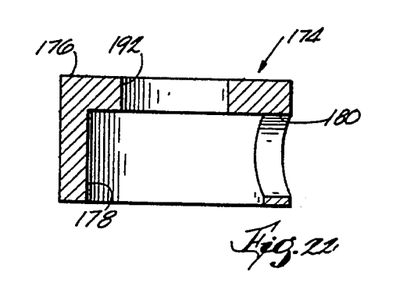
FIG. 22 is a sectional view taken along line 22—22 of FIG. 21.
Figure 23:
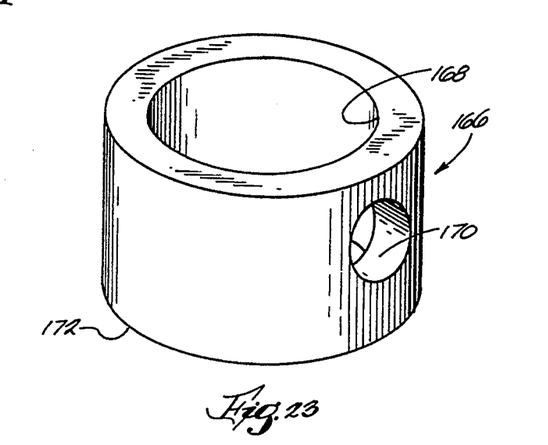
FIG. 23 is a perspective view of the rubber collar used in the assembly of FIG. 20.

A vacuum exhaust tube 182 is mounted in aligned openings 170 and 180 in the collars 166, 174, respectively. The tube 182 is held securely in place by a set screw 183 threaded into the side of collar 174 as shown in FIG. 21.

A flexible tube 184 is connected to the end of tube 182 at one end and to a source of vacuum at the other end (not shown).

The vacuum charging assembly described above operates as follows. When tank 160 is moved into position at the charging station, the preassembled charging assembly, including collars 166, 174 and tubes 182, 184 is pressed over the protruding end of fitting 162 with the lower end passageway 168 of rubber collar 166 fitting snugly around the fitting 162. A space 185 is provided between the end of collar 174 and the top of fitting 162 so that the end 172 of collar 166 can be pressed into snug engagement with the tank wall.

A charging funnel 186 having a mouth portion 188 and a tip portion 190 is inserted into tank 160 through opening 192 in flange 176 of collar 174. The outer diameter of funnel tip portion 190 is slightly smaller that the opening through insert member 164 to provide a small space 196 between the funnel tip 190 and the insert 164.

With the parts positioned as shown in FIG. 20 and with all other openings in the tank plugged, the tank 160 is ready to be charged. Charging is accomplished by dropping a charge of polymer powdered material into the mouth portion of funnel 186. Shortly before or simultaneously with the introduction of the powder, a vacuum is applied to tube 182. The application of vacuum will cause air in the tank to flow out of the tank around the tip portion of the funnel as shown by the arrows in FIG. 20. This application of vacuum to the interior of the tank as the powder is introduced into the tank facilitates the flow of the powder into the tank and results in a suitable charge being introduced in a relatively short period of time.

An alternate method for preparing the tank halves for subsequent fabrication steps is as follows.

First, the tank halves are washed with a hot caustic solution inside and out, preferably by high pressure spray jets. The temperature of the wash is in the range of 140°–160° F. and the pH of the caustic solution is within the range of 14–16.

Next is a hot water rinse which thoroughly rinses the caustic residue from the cleaned tank halves. Temperature of the rinse water is in the range of 110°–130° F.

Next is a zinc phosphating operation. The tanks are flooded internally with a heated solution of zinc phosphate. The temperature of the solution is in the range of 130°–160° F. and the zinc concentration in the solution is in the range of 14–15%. The zinc phosphate reacts with the steel and forms a coating on the inside of the tank halves. This coating provides a textured surface which enhances the ability of the polymer material to bond by exposing more bond sites and developing an oxide layer.

The next step is another hot water rinse wherein the temperature of the rinse is in the range of 150°–170° F. Next, the tank halves are moved through an air drying operation wherein the air temperature is in the range of 220°–250° F.

Following the air drying step, the tank halves are transported to the welding station wherein the tank halves are welded to each other by laser welding as described previously herein.

It should be pointed out that in the method set forth above, the tank halves, after they are produced by the drawing operation as described above, will be embossed and punched before the washing step.

After the tank halves are welded together, the tanks are charged with a powdered polymer material preferably as set forth above relative to FIGS. 20-23.

The next step is the rotational casting step wherein the inner shell of non-corrosive material is formed in a suitable oven.

With the tank prepared as set forth above, the preferred polymeric material used is from the olefin family. More particularly, the polymer is polyethylene. The material is stabilized to be used in hot water applications. Additionally, the polymer material is maleic anhydride modified. In the casting step, the modified polymer is heated to its melt point (within the range of 200°–240° F.) and is subsequently heated up to a temperature within the range of 400°–450° F.

When so heated, free oxygen groups at points along the molecular chain are formed. This facilitates the interaction with oxygen molecules present on the oxidized phosphate surface to create a strong bond between the polymer inner tank and the steel tank. The oxidized surface and the increased surface area created by the zinc phosphate together provide an ideal substrate for producing the desired bond. Thus, in the finished tank, the internal shell of non-corrosive polymer material will be tightly bonded to the internal surface of the outer steel tank.

I claim:

1. A method of making a tank for containing contents comprising the steps of:
   (i) forming a pair of top and bottom half members by deep drawing, one of the half members having an opening therein;
   (ii) fastening the top and bottom half members together by welding to form an outer shell having an internal surface;
   (iii) introducing a non-corrosive polymer material into one of the half members through the opening therein;
   (iv) simultaneously rotating and heating the outer shell having the non-corrosive polymer material introduced therein, thereby causing the entire charge of polymer material to be uniformly distributed over the internal surface of the outer shell to thereby form an inner shell of non-corrosive material inside the outer shell wherein the inner shell provides a substantially leak-tight liner for the outer shell to thus prevent contact between the contents of the tank and the outer shell, said outer shell serving as a mold for the inner shell wherein said mold becomes a permanent part of the completed tank.

2. The method of making a tank according to claim 1 wherein the temperature of the heat applied in step (iv) is within the range of 350° to 800° F.

3. The method of making a tank according to claim 1 wherein the weight of the polymer material introduced into the outer shell in step (iii) is within the range of two to seven pounds.

4. The method of making a tank according to claim 1 wherein the rotational movement in step (iv) is comprised of simultaneous rotation of the shell about two separate axes.

5. The method of making a tank according to claim 1 wherein the rotational movement in step (iv) is comprised of rotation of the shell about its vertical axis while simultaneously causing said shell to be rocked back and forth about a second axis extending at right angles to said vertical axis.

6. The method of making a tank according to claim 5 wherein the rocking back and forth about the second axis extends approximately 50° from horizontal.

7. A method of making a tank for containing contents comprising the steps of:
   (i) forming a pair of top and bottom half members by deep drawing;
   (ii) introducing a polymer material into one of the half members when the half member is in a vertical position;
   (iii) fastening the top and bottom half members together by welding to form an outer shell having an internal surface, said welding procedure taking place after charging step (ii) with the top and bottom half members in a vertical position and with the polymer material therein lying at the bottom of one of said half members;
   (iv) simultaneously rotating and heating the outer shell having the non-corrosive polymer material introduced therein, thereby causing the polymer material to be uniformly distributed over the internal surface of the outer shell to thereby form an inner shell of non-corrosive material inside the outer shell wherein the inner shell provides a substantially leaktight liner for the outer shell to thus prevent contact between the contents of the tank and the outer shell, said outer shell serving as a mold for the inner shell wherein said mold becomes a permanent part of the completed tank.

8. The method according to claim 7 in which said welding procedure set forth in paragraph (iii) is comprised of laser welding.

9. The method of claim 7 in which the movement in step (iv) is comprised of rotation of the outer shell about a horizontal axis with the longitudinal axis of the outer shell extending parallel to said horizontal axis while simultaneously causing said outer shell to be rocked back and forth about a second horizontal axis extending at right angles to said vertical axis.

10. A method according to claim 9 wherein the rocking back and forth about the second axis in step (iv) extends approximately 50° from horizontal.

11. A method of making a tank for containing contents comprising the steps of:
   (i) stamping a circular blank from a sheet of steel;
   (ii) forming a pair of top and bottom half members by deep drawing said circular blanks, one of the half member having an opening therein;
   (iii) introducing a polymer material into one of the half members through the opening therein;
   (iv) fastening the top and bottom half members together by welding to form an outer shell having an internal surface, said welding procedure taking place after charging step (ii) with the top and bottom half members in a vertical position and with the polymer material therein lying at the bottom of one of said half members;
   (v) simultaneously rotating and heating the outer shell having the non-corrosive polymer material introduced therein, thereby causing the polymer material to be uniformly distributed over the internal surface of the outer shell to thereby form an inner shell of non-corrosive material inside the outer shell wherein the inner shell provides a substantially leaktight liner for the outer shell to thus prevent contact between the contents of the tank and the outer shell, said outer shell serving as a mold for the inner shell wherein said mold becomes a permanent part of the completed tank.

12. The method according to claim 11 in which after the performance of step (i), openings are punched in said half members and connector fittings are then installed in said openings by welding.

13. A method of making a tank for containing contents comprising the steps of:
   (i) forming a pair of top and bottom half members by deep drawing;
   (ii) fastening the top and bottom half members together by welding to form an outer shell having an internal surface;
   (iii) introducing a non-corrosive polymer material into the outer shell before or after the welding step;
   (iv) simultaneously rotating and heating the outer shell having the non-corrosive polymer material introduced therein, thereby causing the polymer material to be uniformly distributed over the internal surface of the outer shell to thereby form an inner shell of non-corrosive material inside the outer shell wherein the inner shell provides a substantially leaktight liner for the outer shell to thus prevent contact between the contents of the tank and the outer shell, said outer shell serving as a mold for the inner shell wherein said mold becomes a permanent part of the completed tank;
   (v) transferring the tank through a cooling chamber.

14. A method of making a tank for containing contents comprising the steps of:
   (i) forming a pair of top and bottom half members by deep drawing;
   (ii) fastening the top and bottom half members together by welding to form an outer shell;
   (iii) introducing a non-corrosive polymer material into the outer shell before or after the welding step;
   (iv) loading said outer shells on a rotatable carousel having a horizontal axis of rotation with the axis of said outer shells extending parallel with the axis of said carousel;
   (v) moving said loaded carousel into an oven through an open door of the oven, said oven having a horizontal axis extending at right angles to said carousel axis;
   (vi) closing the oven door;
   (vii) rotating said carousel about its axis while at the same time rocking said oven back and forth about its axis;
   (viii) applying heat to the outer shells on the carousel during step (vii) to thus cause the polymer material to be uniformly distributed over the internal surface of the outer shells to thereby form inner shells of non-corrosive material inside the outer shells wherein the inner shells provide a substantially leak-tight liner for the outer shells to thus prevent contact between the contents of the tank and the outer shells, said outer shells serving as a mold for the inner shells wherein said mold becomes a permanent part of the completed tank.

15. The method of claim 14 in which after step (viii) the oven door is opened, the loaded carousel is transferred out of the oven and then through a cooling chamber.

16. A method of making a tank for containing contents comprising the steps of:
   (i) forming a pair of top and bottom half members by deep drawing;
   introducing a polymer material into one of the half members;
   (iii) fastening the top and bottom half members together by welding, said welding procedure taking place after charging step (ii) with the top and bottom half members in a vertical position and with the polymer material therein lying at the bottom of one of said half members;

(iv) simultaneously rotating and heating the outer shell having the non-corrosive polymer material introduced therein, thereby causing the polymer material to be uniformly distributed over the internal surface of the outer shell to thereby form an inner shell of non-corrosive material inside the outer shell wherein the inner shell provides a substantially leaktight liner for the outer shell to thus prevent contact between the contents of the tank and the outer shell, said outer shell serving as a mold for the inner shell wherein said mold becomes a permanent part of the completed tank.

17. A method of making tanks for containing contents comprising the steps of:

(i) forming a pair of top and bottom half members by deep drawing;

(ii) introducing a polymer material into one of the half members;

(iii) fastening the top and bottom half members together by welding, said welding procedure taking place after step (ii) with the polymer material positioned in said one half member at a location remote from the weld;

(iv) simultaneously rotating and heating the outer shell having the non-corrosive polymer material introduced therein, thereby causing the polymer material to be uniformly distributed over the internal surface of the outer shell to thereby form an inner shell of non-corrosive material inside the outer shell wherein the inner shell provides a substantially leaktight liner for the outer shell to thus prevent contact between the contents of the tank and the outer shell, said outer shell serving as a mold for the inner shell wherein said mold becomes a permanent part of the completed tanks.

18. The method of claim 17 wherein the temperature of the heat applied in step (iv) is within the range of 350° F. to 800° F.

19. The method of claim 17 wherein the step (i) is further characterized as comprising a three-step drawing action, the first step forming a blank into a first intermediate tank part by a first draw, the second step forming the first intermediate tank part into a second intermediate tank part by a reverse draw, and the third step forming the second intermediate part into a final tank half of the desired size and shape by a redraw step.

20. The method of claim 17 wherein between steps (i) and (ii) the tanks are transported to a tank connector installation station wherein openings are punched in the tank halves and thereafter connector fittings of a suitable size and shape are installed by welding.

21. The method of claim 17 wherein before said step (iv), the tank shells are loaded on a rotatable carousel having a horizontal axis of rotation with the axis of said tanks extending parallel with the axis of said carousel, then moving said loaded carousel into an oven through an open door of the oven, said oven having a horizontal axis extending at right angles to said carousel axis, then closing the oven door;

step (iv) of claim 17 being further characterized wherein the rotational movement is provided by rotating said carousel about its axis while at the same time rocking said oven back and forth about its axis.

22. The method of claim 21 wherein after step (iv) the tanks are passed through a cooling chamber.

23. The method of claim 23 wherein a pair of track-mounted shuttle carts are provided, one of said shuttle carts adapted to transport a loaded carousel between the oven and the cooling chamber, the second of said shuttle carts adapted to transfer a carousel from the cooling chamber to a loading station from which the loaded carousel is transferred into the oven.

24. The method of claim 23 wherein before said step (iv), the tank shells are loaded on a rotatable carousel having a horizontal axis of rotation with the axis of said tanks extending parallel with the axis of said carousel, then moving said loaded carousel into an oven through an open door of the oven, said oven having a horizontal axis extending at fight angles to said carousel axis, then closing the oven door;

step (iv) of claim 23 being further characterized wherein the rotational movement is provided by rotating said carousel about its axis while at the same time rocking said oven back and forth about its axis.

25. The method of claim 24 wherein after step (iv) the tanks are passed through a cooling chamber.

26. The method of claim 25 wherein a pair of track-mounted shuttle carts are provided, one of said shuttle carts adapted to transport a loaded carousel between the oven and the cooling chamber, the second of said shuttle carts adapted to transfer a carousel from the cooling chamber to a loading station from which the loaded carousel is transferred into the oven.

27. A method of making a tank for containing contents comprising the steps of:

(i) forming a pair of top and bottom half members by deep drawing, one of the half members having an opening therein;

(ii) washing the half members;

(iii) applying a solution of zinc phosphate to the internal surface of the half members;

(iv) fastening the top and bottom half members together by welding to form an outer shell having an internal surface;

(v) introducing a non-corrosive polymer material into the half members through the opening in one half member;

(vi) simultaneously rotating and heating the outer shell having the non-corrosive polymer material introduced therein, thereby causing the polymer material to be uniformly distributed over the internal surface of the outer shell to thereby form an inner shell of non-corrosive material inside the outer shell wherein the inner shell provides a substantially leak-tight liner for the outer shell to thus prevent contact between the contents of the completed tank and the outer shell, said outer shell serving as a mold for the inner shell wherein said mold becomes a permanent part of the completed tank, the inner shell of non-corrosive material being bonded to the outer shell.

28. The method according to claim 27 wherein a vacuum is applied to the tank during step (v).

29. The method according to claim 27 wherein the polymer material referred to in step (v) is heated to its melting point within the range of 200°–240° F. and is subsequently heated up to a temperature within the range of 400°–450° F.

30. The method according to claim 27 wherein the zinc concentration of the zinc phosphate solution of step (iii) is in the range of 14–16%.

31. The method according to claim 27 wherein the polymer material referred to in step (v) is polyethylene.

32. The method according to claim 27 wherein the polymer material referred to in step (v) is maleic anhydride modified.

33. A method of making a tank for containing contents comprising the steps of:
 (i) forming a pair of top and bottom half members by deep drawing, said deep drawing comprising a three-step drawing action, the first step forming a blank into a first intermediate tank part by a first draw, the second step forming the first intermediate tank part into a second intermediate tank part by a reverse draw, and the third step forming the second intermediate part into a final tank half of the desired size and shape by a redraw step, one of said half members having an opening therein;
 (ii) fastening the top and bottom half members together by welding to form an outer shell having an internal surface;
 (iii) introducing a non-corrosive polymer material into one of the half members through the opening therein;
 (iv) simultaneously rotating and heating the outer shell having the non-corrosive polymer material introduced therein, thereby causing the entire amount of polymer material to be uniformly distributed over the internal surface of the outer shell to thereby form an inner shell of non-corrosive material inside the outer shell wherein the inner shell provides a substantially leak-tight liner for the outer shell to thus prevent contact between the contents of the completed tank and the outer shell, said outer shell serving as a mold for the inner shell wherein said mold becomes a permanent part of the completed tank.

34. A method of making a tank containing contents comprising the steps of:
 (i) forming a pair of top and bottom half members by deep drawing, one of said half members having an opening therein;
 (ii) transporting the half members to a connector installation station wherein openings are punched in the half members and thereafter connector fittings of a suitable size and shape are installed by welding;
 (iii) fastening the top and bottom half members together by welding to form an outer shell having an internal surface;
 (iv) introducing a non-corrosive polymer material into one of the half members through the opening therein;
 (v) simultaneously rotating and heating the outer shell having the non-corrosive polymer material introduced therein, thereby causing the entire amount of polymer material to be uniformly distributed over the internal surface of the outer shell to thereby form an inner shell of non-corrosive material inside the outer shell wherein the inner shell provides a substantially leak-tight liner for the outer shell to thus prevent contact between the contents of the completed tank and the outer shell, said outer shell serving as a mold for the inner shell wherein said mold becomes a permanent part of the completed tank.

35. A method of making a tank for containing contents comprising the steps of:
 (i) forming a pair of top and bottom half members by deep drawing, one of the half members having an opening therein;
 (ii) fastening the top and bottom half members together by welding to form an outer shell having an internal surface;
 (iii) introducing a non-corrosive polymer material into the half members, the polymer material being introduced through the opening in the tank wall after the welding step (ii);
 (iv) simultaneously rotating and heating the outer shell having the non-corrosive polymer material introduced therein, thereby causing the entire charge of polymer material to be uniformly distributed over the internal surface of the outer shell to thereby form an inner shell of non-corrosive material inside the outer shell wherein the inner shell provides a substantially leak-tight liner for the outer shell to thus prevent contact between the contents of the tank and the outer shell, said outer shell serving as a mold for the inner shell wherein said mold becomes a permanent part of the completed tank.

36. The method according to claim 35 wherein step (iii) is further characterized wherein the introduction of the polymer material is facilitated by applying a vacuum to the inside of the tank during the introduction step.

37. A method of making a tank for containing contents comprising the steps of:
 (i) forming a pair of top and bottom half members, one of said half members having an opening therein;
 (ii) forming an intermediate cylindrical member;
 (iii) fastening the top, bottom and intermediate members together by welding to form an outer shell having an internal surface;
 (iv) introducing a non-corrosive polymer material into one of the half members through the opening therein;
 (v) simultaneously rotating and heating the outer shell having the non-corrosive polymer material introduced therein, thereby causing the entire charge of polymer material to be uniformly distributed over the internal surface of the outer shell to thereby form an inner shell of non-corrosive material inside the outer shell wherein the inner shell provides a substantially leak-tight liner for the outer shell to thus prevent contact between the contents of the completed tank and the outer shell, said outer shell serving as a mold for the inner shell wherein said mold becomes a permanent part of the completed tank.

38. A method of making a tank for containing contents comprising the steps of:
 (i) forming a pair of top and bottom half members by deep drawing;
 (ii) forming an intermediate cylindrical member;
 (iii) introducing a polymer material into one of the half members;
 (iv) fastening the top, bottom and intermediate half members together by welding, said welding procedure taking place after step (iii) with the polymer material positioned in said one half member at a location remote from the weld [area]between the half members;

(v) simultaneously rotating and heating the outer shell having the non-corrosive polymer material introduced therein, thereby causing the polymer material to be uniformly distributed over the internal surface of the outer shell to thereby form an inner shell of non-corrosive material inside the outer shell wherein the inner shell provides a substantially leak-tight liner for the outer shell to thus prevent contact between the contents of the tank and the outer shell, said outer shell serving as a mold for the inner shell wherein said mold becomes a permanent part of the completed tank.

39. A method of making a tank for containing contents comprising the steps of:
   (i) forming a pair of top and bottom members by a metal deformation procedure, one of the members having an opening therein;
   (ii) fastening the top and bottom members together by welding to form an outer shell having an internal surface;
   (iii) introducing a non-corrosive polymer material into one of the members through the opening therein;
   (iv) simultaneously rotating and heating the outer shell having the non-corrosive polymer material introduced therein, thereby causing the entire charge of polymer material to be uniformly distributed over the internal surface of the outer shell to thereby form an inner shell of non-corrosive material inside the outer shell wherein the inner shell provides a substantially leak-tight liner for the outer shell to thus prevent contact between the contents of the tank and the outer shell, said outer shell serving as a mold for the inner shell wherein said mold becomes a permanent part of the completed tank.

40. A method of making tanks for containing contents comprising the steps of:
   (i) forming a pair of top and bottom members by a metal deformation procedure;
   (ii) introducing a polymer material into one of the members;
   (iii) fastening the top and bottom members together by welding, said welding procedure taking place after step (ii) with the polymer material positioned in said one member at a location remote from the weld;
   (iv) simultaneously rotating and heating the outer shell having the non-corrosive polymer material introduced therein, thereby causing the polymer material to be uniformly distributed over the internal surface of the outer shell to thereby form an inner shell of non-corrosive material inside the outer shell wherein the inner shell provides a substantially leak-tight liner for the outer shell to thus prevent contact between the contents of the tank and the outer shell, said outer shell serving as a mold for the inner shell wherein said mold becomes a permanent part of the completed tanks.

* * * * *